(12) United States Patent
Vasquez

(10) Patent No.: US 7,866,257 B2
(45) Date of Patent: Jan. 11, 2011

(54) COOKING UTENSIL FOR FRYING TACO SHELLS

(76) Inventor: Joseph Y. Vasquez, 976 E. Bedford, Fresno, CA (US) 93720

(*) Notice: Subject to any disclaimer, the term of this patent is extended or adjusted under 35 U.S.C. 154(b) by 816 days.

(21) Appl. No.: 11/497,173

(22) Filed: Aug. 1, 2006

(65) Prior Publication Data

US 2008/0028950 A1 Feb. 7, 2008

(51) Int. Cl.
*A47J 43/18* (2006.01)
(52) U.S. Cl. ...................................................... 99/426
(58) Field of Classification Search .................. 99/339, 99/340, 349–355, 348, 444–450, 394, 402, 99/403, 439, 421 A; 294/171, 50, 7, 137, 294/99.2, 149, 26.5; 16/422–428, 110.1; 426/496, 512, 514; 425/276, 286, 406, 412, 425/458; 211/72
See application file for complete search history.

(56) References Cited

U.S. PATENT DOCUMENTS

| | | | | |
|---|---|---|---|---|
| 2,664,812 A * | 1/1954 | Molina | ........................ | 99/426 |
| 2,775,929 A * | 1/1957 | Johnson et al. | ................ | 99/426 |
| 2,778,294 A * | 1/1957 | Ulloa | .......................... | 99/426 |
| 2,814,981 A * | 12/1957 | Wendel | ....................... | 99/426 |
| 2,847,933 A * | 8/1958 | Pate | ............................ | 99/426 |
| 2,957,404 A | 10/1960 | Richardson | | |
| 3,020,826 A | 2/1962 | Silva | | |
| 3,693,537 A | 9/1972 | Johnson et al. | | |
| 3,745,911 A | 7/1973 | Kennedy, Jr. et al. | | |
| 3,759,165 A | 9/1973 | Wallace | | |
| 3,817,163 A | 6/1974 | Kizziar et al. | | |
| D249,219 S * | 9/1978 | Stence | .......................... | D7/672 |
| 4,154,155 A * | 5/1979 | Brignall | ....................... | 99/426 |
| 4,154,156 A * | 5/1979 | Brignall | ....................... | 99/426 |
| 4,173,926 A * | 11/1979 | Brignall | ....................... | 99/349 |
| 4,494,454 A * | 1/1985 | Sparks | ......................... | 99/426 |
| 4,517,887 A | 5/1985 | Childress | | |
| 4,729,589 A * | 3/1988 | Puskar | ....................... | 294/26.5 |
| D326,592 S | 6/1992 | Denton | | |
| 5,937,743 A | 8/1999 | Overstreet | | |
| D503,593 S * | 4/2005 | Walker | ......................... | D7/672 |
| 7,552,674 B1 * | 6/2009 | Cotter | .......................... | 99/426 |
| 2004/0241272 A1 * | 12/2004 | Feijen | .......................... | 425/406 |
| 2006/0057265 A1 * | 3/2006 | Knobel | ......................... | 426/512 |

* cited by examiner

*Primary Examiner*—Geoffrey S Evans
(74) *Attorney, Agent, or Firm*—Richard A. Ryan

(57) ABSTRACT

A cooking utensil for frying a tortilla into a taco shell comprises a shell section having first and second U-shaped shell members and a handle assembly that linearly biases the second shell member into nested relation with the first shell member. A brace member attaches to the first shell member. The first end of an outer tubular shaft attaches a first handle member and its second end slidably attaches to the brace member. An inner shaft having a first end attached to a second handle member and a second end pivotally attached to the second shell member is slidably disposed in the outer shaft. The first handle member has a cavity that receives the second handle member, which is biased outwardly from the cavity by a spring. A user supplied anti-biasing force separates the first and second shell members for insertion of the tortilla and removal of the taco shell.

20 Claims, 4 Drawing Sheets

COOKING UTENSIL FOR FRYING TACO SHELLS

CROSS-REFERENCE TO RELATED APPLICATIONS

Not Applicable.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to devices utilized to cook food. More specifically, this invention relates to cooking utensils that are configured to form the shape of a food item and to assist in the cooking thereof. Even more specifically, this invention relates to such cooking utensils that are configured for forming and frying traditional taco shells.

B. Background

Many people enjoy eating foods that are generally identified with a specific ethnic or cultural background, whether they are or are not of that specific background. For instance, many people enjoy eating foods that are traditionally thought of as Mexican or Mexican-style food, no matter what ethnic or cultural background they consider themselves to belong. One popular Mexican food item that is enjoyed by many people is the traditional U-shaped, hard-shell taco. As well known, the traditional hard-shell taco is made from a soft texture corn or flour tortilla that is folded into the U-shaped configuration, fried by immersing the tortilla into heated cooking oil contained in a frying pan, deep fryer or other cooking container, removed from the cooking oil and then filled with filling. While there are many possible types of fillings for a taco, a popular combination of food items for the filling is lettuce, cheese, tomatoes and a meat product, such as ground beef and the like. Some people enjoy their tacos with refried or other bean products inside the taco shell or on a plate served with the taco.

In addition to eating ethnic or cultural foods, many people enjoy cooking these foods themselves. With regard to tacos, for ease of preparation many people purchase pre-formed and pre-cooked taco shells from the store and then add a filling that they prepare themself. Unfortunately, as with many other foods that are mass produced and packaged for stores, the taco shells purchased from a store are not as tasty or generally as healthy as a taco shell that is freshly made by the cook when he or she is preparing the meal. People who do prepare the taco shell themselves typically either manually form the taco shell while cooking the tortilla in the frying pan, by turning it over into the standard U-shape while the tortilla is cooking, or utilize a cooking utensil that is configured to form the tortilla into the U-shape while its frying in a pan or deep fryer. Preparing a taco shell in a frying pan by folding the tortilla into the U-shape and holding it there while it fries in the oil is difficult and can subject the cook to injury from the heated oil splattering on his or her hand and/or arm. The use of deep fryers, which require the tortilla to be placed in an appropriately configured taco shell mold and then submerged in the heated oil and left for sufficient time to fry the tortilla into the hard shell, tend to saturate the finished taco shell with oil, a less than desired result. In fact, this method of cooking taco shells somewhat reduces one of the main benefits of home cooking, which is to provide a fresher and more healthy meal.

Many modern restaurants attempt to mimic the quality and health benefits that are typically associated with home cooked meals. Generally, in order to do so, these restaurants utilize many of the same ingredients and cooking methods that people use at home. With regard to tacos, the "home style" cooking restaurants typically utilize fresh tortillas and cook their taco shells in a frying pan or the like having a relatively (i.e., compared to a fryer) small amount of cooking oil, typically olive oil. Unlike most home cooking, however, restaurants have the need to prepare a relatively large number of taco shells for consumption by its patrons. On a busy night, this could require the restaurant to prepare many hundreds or even thousands of taco shells. Naturally, such needs make it difficult to prepare a taco shell by folding it in the pan while it fries.

As those who make their own taco shells know, whether the taco shells is made at home or in a restaurant, forming and frying a tortilla into a good, crispy and relatively healthy taco shell using a frying pan is no easy task. First, in order to obtain the desired tasty and relatively golden colored fried taco shell, the cook must utilize the proper type and amount of cooking oil and heat the oil to a temperature that is sufficiently hot to fry the tortilla, but not so hot so as to cause the cooking oil to excessively splatter against the cook or the surfaces of other nearby cooking equipment. Second, the cook must fold the tortilla into the desired taco shell U-shape and hold the normally soft tortilla in that shape while it is being fried by immersion in the heated cooking oil. Third, the cook must have the ability to safely and in a timely fashion remove the fried tortilla (i.e., the now formed taco shell) from the cooking oil in a manner that does not break or otherwise damage the taco shell, splatter cooking oil and result in contact between the cook and the frying pan.

Several patents describe devices configured to simplify and improve the making of taco shells from scratch. For instance, U.S. Pat. No. 2,957,404 to Richardson describes a tortilla holder having a U-shaped plate that attaches to a bifurcated rod which attaches to the handle. A resilient wire clip holds the soft tortilla to the U-shaped plate, which is provided with holes to allow the oil to permeate the entire interior of the tortilla, while cooking the tortilla to form the taco shell. U.S. Pat. No. 3,020,826 to Silva describes a cooking utensil having a pair of horizontally displaced taco holding members that connect to a handle section configured for use in a deep fat fryer. The user squeezes a pair of handle members together to spread the taco holding members apart for insertion of the tortilla. U.S. Pat. No. 3,693,537 to Johnson, et al. describes a tortilla cooking utensil having a U-shaped piece of metal attached to a spring clip handle that is configured to grasp one end of the tortilla in order to turn it over in a skillet. The handle has a V-notched portion that permits the handle to rest on the upper edge of the skillet. U.S. Pat. No. 3,745,911 to Kennedy, Jr. et al. describes a cooking utensil having a multi-section outer plate that folds over a U-shaped inner plate with the tortilla disposed between. U.S. Pat. No. 4,517,887 to Childress describes a taco shell frying mold having an outer U-shaped mold piece and an inner U-shaped mold piece that are dimensioned for nesting with the tortilla disposed between. Each mold piece has a handle, which are joined together with a C-shaped clip when cooking the tortilla. U.S.

Pat. No. 5,937,743 to Overstreet describes a taco cooking device comprising a first mold half joined with a second mold half to form a substantially U-shaped mold for the tortilla. A handle attaches to a securement means that snugly secures a meat filled taco in place during deep frying.

Although the aforementioned prior art patents describe various taco shell cooking utensils that can be utilized for cooking a tortilla into a U-shaped taco shell, they all present various limitations that impede their usefulness and, therefore, their acceptance. These limitations include handles that are not easy to grip and/or utilize to form the desired U-shape, handles that are not very well configured for use in a frying pan and/or taco mold pieces that can be difficult to adjust for the taco shell, particularly when hot after cooking. What is needed, therefore, is an improved cooking utensil for frying taco shells that is more useful for forming soft, generally flat tortillas into hard, U-shaped taco shells. Preferably, the improved taco shell utensil will have a handle assembly that is easy to receive and hold the tortilla so as to form it into the desired U-shape for cooking. In addition, the taco shell utensil should be configured for ease of removing the cooked taco shell from the utensil. It is also preferred that the improved taco shell utensil be configured for use in frying pans having sidewalls of different heights while utilizing a relatively small amount of cooking oil such that the utensil maintains a side of the taco shell in the cooking oil while it is being formed. It is also preferred that the taco shell utensil be supported on the frying pan sidewall in a manner that dissipates the heat from the frying pan.

SUMMARY OF THE INVENTION

The cooking utensil for frying taco shells of the present invention provides the benefits and solves the problems and/or overcomes the limitations of the prior art set forth above. That is to say, the present invention discloses a taco shell cooking utensil comprising a handle assembly that cooperatively engages a taco shell forming section to relatively easily and quickly form a soft tortilla into the desired U-shaped configuration for the taco shell. The cooking utensil for frying taco shells of the present invention has a handle assembly that is easy to grip and manipulate for purposes of forming and cooking a tortilla into a taco shell. The cooking utensil of the present invention is configured to be safely utilized with various sized frying pans while utilizing a relatively small amount of cooking oil and to dissipate the heat from the frying pan so as to not overly heat the cooking utensil. The present invention is an improvement over the prior art taco shell cooking devices by providing a taco shell cooking utensil that is easier to use, safer because it requires less cooking oil and results in a better cooked taco shell.

In one general aspect of the present invention, the cooking utensil for frying taco shells comprises a shell section, a handle assembly and a brace assembly interconnecting the shell section and the handle assembly. The shell section is made up of a first shell member having a substantially U-shaped body defining an open first end and an opposing second end and a second shell member having a substantially U-shaped body defining an open first end and an opposing second end. The second shell member is disposed in the open first end of the first shell member such that the two shell members are in substantially nesting relation with each other. The preferred handle assembly generally comprises a first handle member, a second handle member, a tubular outer shaft having a first end and a second end, and an inner shaft having a first end and a second end, and a biasing mechanism for biasing the second handle member away from the first handle member (i.e., towards the shell section). The inner shaft is slidably disposed inside the tubular outer shaft. The first end of the outer shaft is connected to the first handle member and the second end of the outer shaft is slidably attached to a proximal end of the brace assembly. The first end of the inner shaft is attached to the second handle member and the second end of the inner shaft is pivotally attached to the second shell member. The second handle member is moveably disposed in a cavity on the distal or shell section side of the first handle member. The biasing mechanism is disposed inside the cavity to bias the second handle member out of the cavity and, by way of the inner shaft, to substantially linearly displace the second shell member towards its nesting relation with the first shell member. A connecting mechanism slidably connects the second end of the outer shaft to an aperture at the proximal end of the handle assembly. The distal end of the brace assembly fixedly connects to or is integral with the first shell member. The second end of the inner shaft extends outwardly of the second end of the outer shaft and passes through an aperture on an inner stabilizer brace to pivotally connect to the second shell member. In this manner, one side of the shell section can be maintained against the cooking surface in a relatively small amount of cooking oil while the handle assembly pivots upward to adjust for different heights of frying pan sidewalls.

In the preferred embodiment, the sides and bottom of the body portion of the first and second shell members have a plurality of small holes to reduce spattering of the cooking oil. Also, the first and second handle members are preferably configured to allow the user to ergonomically grasp the handle and pull on the second handle member so as to displace it into the cavity of the first handle member, thereby placing the first and second shell members in spaced apart relation to allow a tortilla to be inserted therebetween. When the pressure on the second handle member is released, the biasing mechanism, which is preferably a spring, biases the second handle member out of the cavity and linearly displaces the second shell member towards the nesting relation with the first shell member to secure the tortilla in the cooking utensil. The shell section is then placed into heated cooking oil in a frying pan to alternatively cook one side of the tortilla at a time, flipping the cooking utensil over as needed to cook the opposite side. When the tortilla is cooked into a taco shell, the user again applies pressure to the second handle member to move the second shell section away from the taco shell and in spaced apart relation to the first shell section so as to facilitate easy removal of the cooked taco shell without damage thereto. To reduce the effect of heat transfer from the frying pan to the cooking utensil and to allow for different sizes of frying pans, a wire heat dissipating element is provided on the outer shaft that has one or more notched sections. In the preferred embodiment, the first and second handle members are made out of plastic and the remaining components are made out of stainless steel.

Accordingly, the primary objective of the present invention is to provide a cooking utensil for frying taco shells that provides the advantages discussed above and overcomes the disadvantages and limitations associated with presently available taco shell cooking devices.

It is also an important objective of the present invention to provide a cooking utensil for frying taco shells that provides an easier and safer device for cooking soft, generally flat tortillas into hard, U-shaped taco shells by frying the tortilla in cooking oil.

It is also an important objective of the present invention to provide a cooking utensil for frying taco shells that has a handle assembly which is easier to grip and to manipulate when forming a tortilla into a taco shell.

It is also an important objective of the present invention to provide a cooking utensil for frying taco shells that has a taco forming section which receives a tortilla and forms it into the desired U-shape for taco shells and which can release the taco shell therefrom without damaging the cooked taco shell.

It is also an important objective of the present invention to provide a cooking utensil for frying taco shells that is configured for use with frying pans and the like having different height sidewalls so as to fry a tortilla in a relatively small amount of cooking oil.

The above and other objectives of the present invention will become readily apparent and are explained in greater detail by reference to the attached figures and the description of the preferred embodiment which follows. As set forth herein, the present invention resides in the novel features of form, construction, mode of operation and/or combination of processes presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures and drawings are merely illustrative of a preferred embodiment and represent one of several different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For purposes of simplifying the present disclosure, reference herein is generally to use of the present invention to cook a soft tortilla into a taco shell. However, as will be readily understood by those skilled in the art, the disclosure is not so limited as it is adaptable to cook other food ingredients into shell-like food products.

Figure 1:
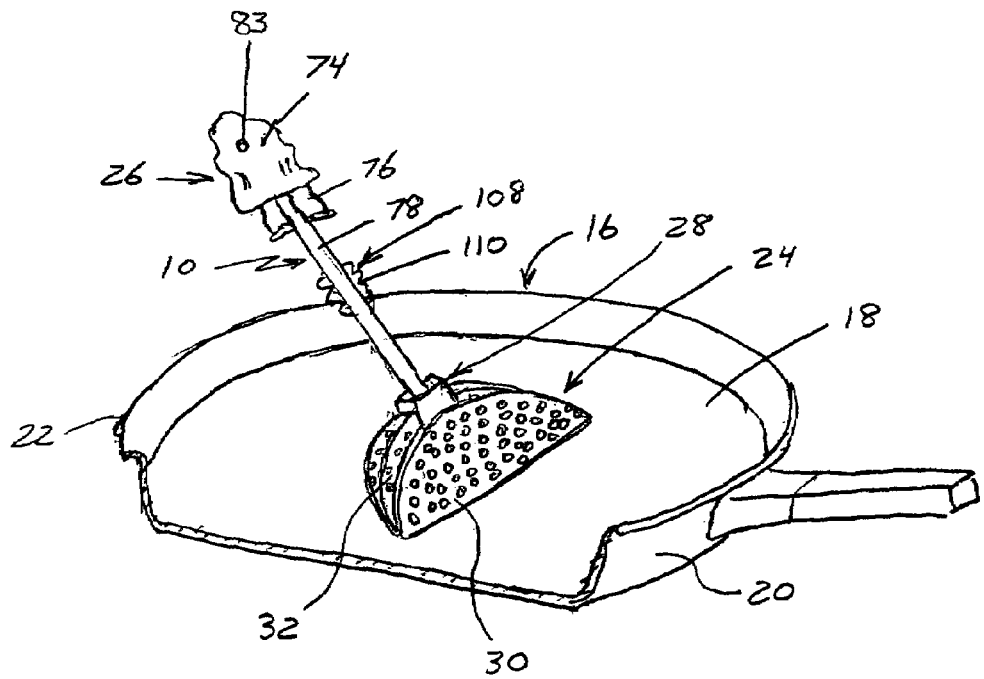
FIG. 1 is a perspective top view of a cooking utensil for frying taco shells configured according to a preferred embodiment of the present invention shown in use in a frying pan to cook a tortilla.
Figure 2:
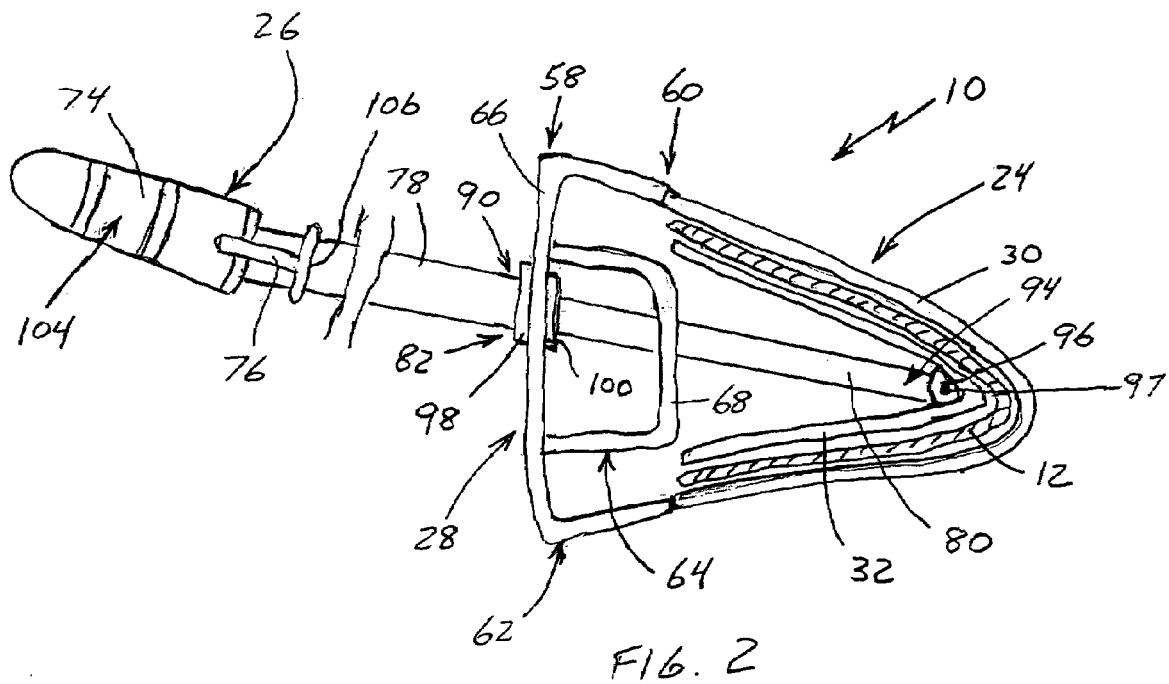
FIG. 2 is a side view of the cooking utensil for frying taco shells of FIG. 1 shown without the heat dissipating device.
Figure 9:
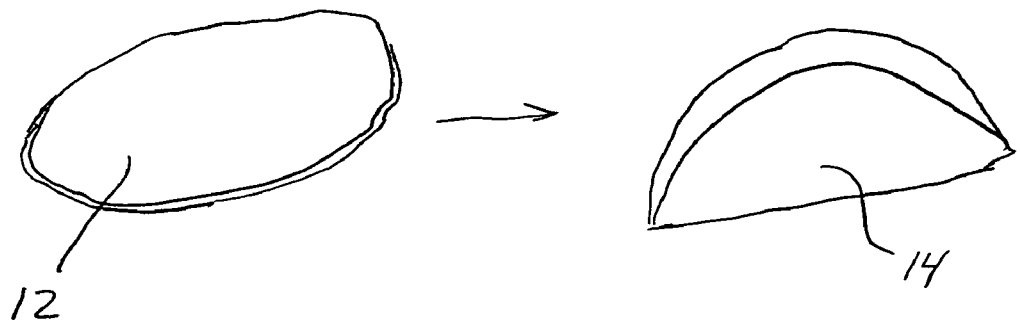
FIG. 9 is a top perspective view of a tortilla and a taco shell.

A cooking utensil for frying taco shells that is manufactured out of the components and configured pursuant to a preferred embodiment of the present invention is shown generally as 10 in the figures. In the preferred embodiment, cooking utensil 10 is utilized to cook a tortilla 12 into a taco shell 14 in a frying pan 16, or the like, as best shown in FIGS. 1, 2 and 9. As will be described in more detail below, frying pan 16 generally contains cooking oil (not shown), such as olive oil or the like, in which cooking utensil 10, configured to secure tortilla 12 therein, is placed to fry tortilla 12 into taco shell 14. The typical frying pan 16 has a cooking surface 18 that is surrounded by an upwardly extending sidewall 20 having an upper edge or rim 22. Although the present invention is described as being utilized with frying pan 16, those skilled in the art will readily understand that the cooking utensil 10 of the present invention can be utilized with other types of cooking containers, including pots and deep fryers. As will be explained in more detail below, one advantage of the cooking utensil 10 of the present invention is that less cooking oil is needed (i.e., a lower level of such oil in the pan 16) than with some prior art taco shell cooking devices. This reduces the splattering that is typical of using cooking oil in a frying pan or other cooking containers, thereby reducing the risk that the cook will burn his or her hand and/or arm. It is also well known that during use of frying pan 16, it is intended that frying pan 16 get quite hot. This heat can transfer to any cooking utensil that is in contact with the hot cooking surface 18 and/or upper edge 22. As such, it is important to configure cooking utensil 10 to minimize heat transfer thereto so as to lessen the likelihood that the cook will burn his or her hands.

Figure 4:
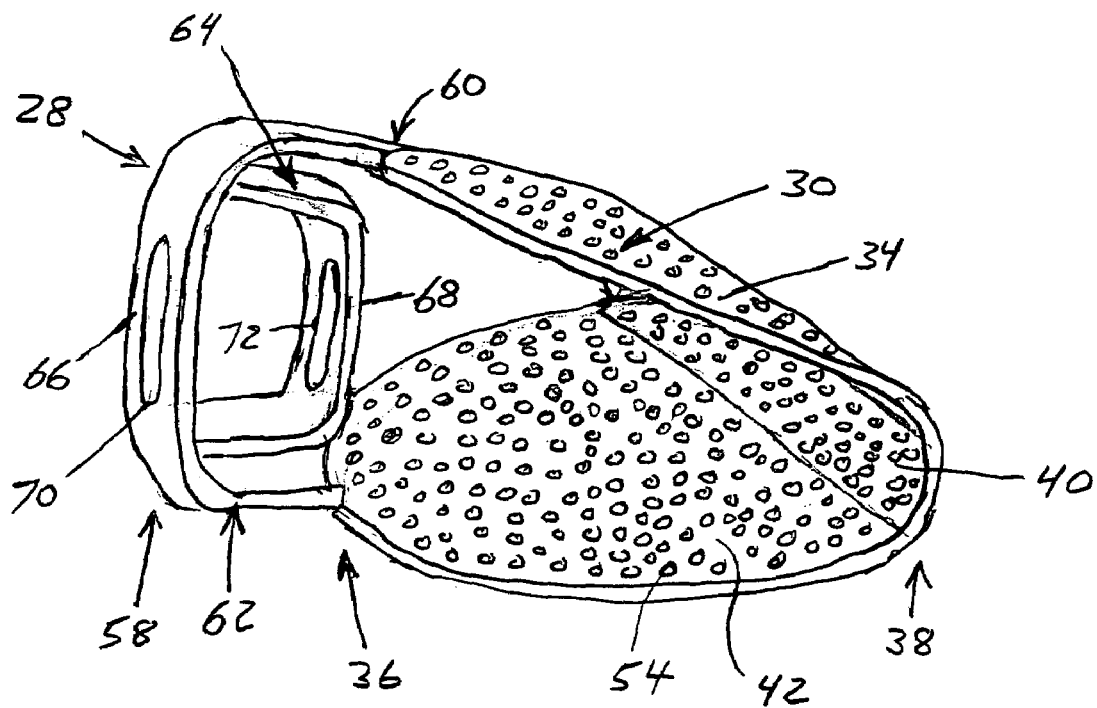
FIG. 4 is a side perspective view of the first shell section and brace assembly of the cooking utensil of the preferred embodiment.
Figure 5:
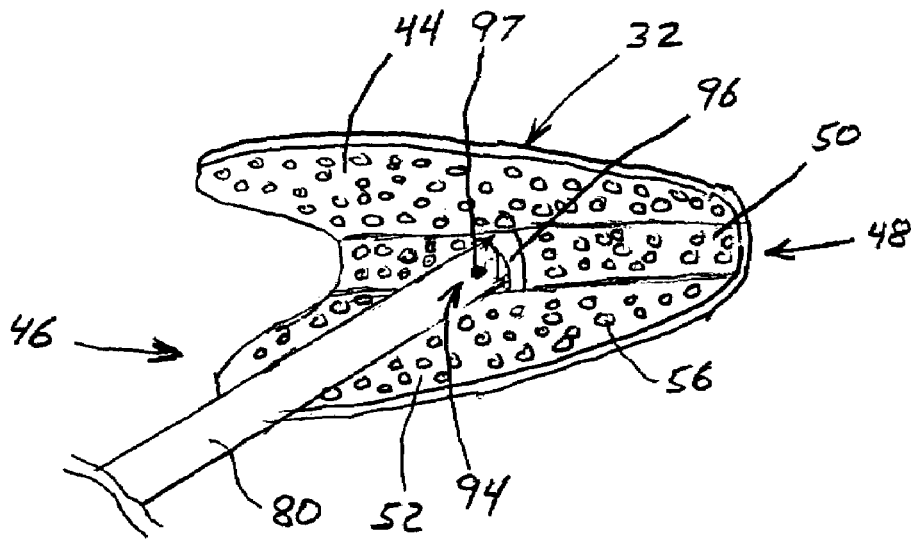
FIG. 5 is a front perspective view of the second shell section with the inner shaft attached thereto.

As shown in FIGS. 1 and 2, cooking utensil 10 generally comprises a shell section 24 configured to securely receive a soft, generally flat tortilla 12, a handle assembly 26 configured to be held and operated by the cook and a brace assembly 28 configured to join the shell section 24 to the handle assembly 26. Shell section 24 is generally made up of a first shell member 30 and a second shell member 32 that are both folded into the generally U-shaped configuration that is desired for taco shell 14. In the preferred embodiment, both first 30 and second 32 shell members will start off as a substantially flat plate that is folded into the desired shape, such that first shell member 30 will have a substantially U-shaped body 34 having an open first end 36, a closed second end 38 forming a trough-like bottom 40 and opposing sides 42, and second shell member 32 will have a substantially U-shaped body 44 having an open first end 46, a closed second end 48 forming a trough-like bottom 50 and opposing sides 52, as best shown in FIGS. 4 and 5. In an alternative embodiment, the second ends 38 and 48 of first 30 and second 32 shell members, respectively, can be partially or substantially open, as it is only necessary that the trough-like bottoms 40 and 50 of second ends 38 and 48 be configured to adequately support tortilla 12 inside cooking utensil 10 so that tortilla 12 does not fall out of cooking utensil 10 during use. As shown in the figures, in the preferred embodiment the sides 42 and bottom 40 of the U-shaped body 34 of first shell member 30 are provided with a plurality of through holes 54 and the sides 52 and bottom 50 of the U-shaped body 44 of second shell member 32 is provided with a plurality of through holes 56. The holes 54 and 56 of first 30 and second 32 shell members, respectively, are provided to facilitate the flow of the heated cooking oil to tortilla 12 when it its disposed inside cooking utensil 10 so as to obtain a more evenly cooked taco shell 14 and reduce splatter of the cooking oil.

Figure 3:
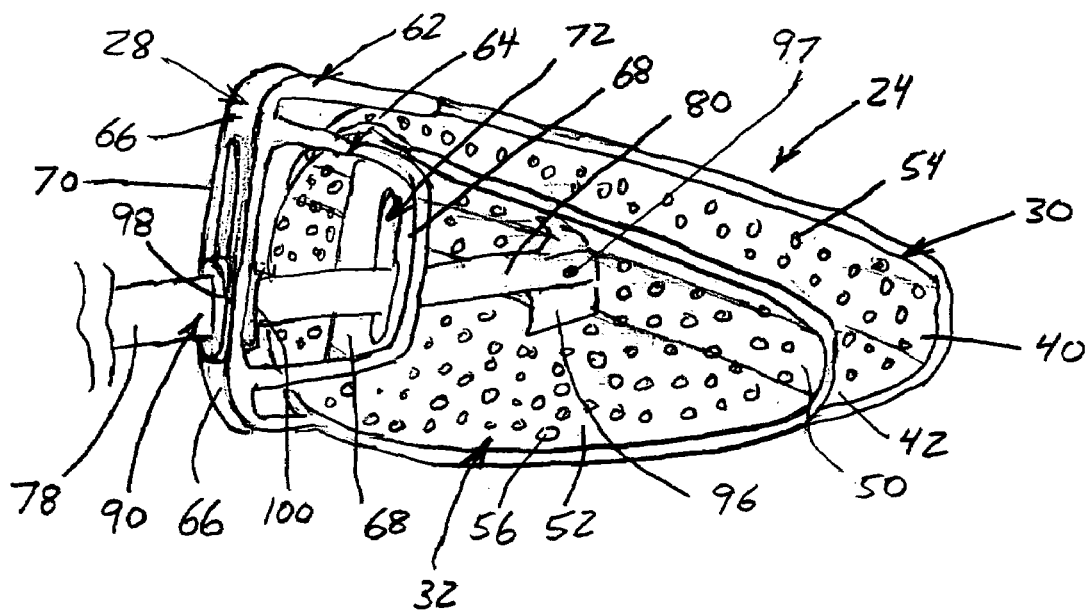
FIG. 3 is an front perspective view of the shell section and brace assembly of the cooking utensil of the preferred embodiment.

As best shown in FIGS. 1 through 3, first shell member 30 and second shell member 32 are in a substantially nesting relation, with second shell member 32 disposed in or through the open first end 36 of first shell member 30. During non-use of cooking utensil 10, the outer side of bottom 50 of second shell member 32 will be in abutting (i.e., completely nested) or near abutting relation with the inner side of bottom 40 of first shell member 30. During use of cooking utensil 10 to cook tortilla 12 into taco shell 14, as shown in FIG. 2, tortilla 12 is disposed between first shell member 30 and second shell member 32 so as to be securely held therein. When it is desired to insert tortilla 12 into cooking utensil 10 or remove the cooked taco shell 14 therefrom, first shell member 30 and second shell member 32 are in spaced apart relation, as best shown in FIG. 3. As set forth in more detail below, the cook operates handle assembly 26 to linearly move and either selectively join or separate first shell member 30 and second shell member 32 to insert tortilla 12 or remove taco shell 14.

As set forth above, interconnecting the shell section 24 and handle assembly 26 is a brace assembly 28. In the preferred embodiment of cooking utensil 10 of the present invention, brace assembly 28 attaches to or is integral with first shell member 30, as best shown in FIG. 4. Preferably, as explained more below, brace assembly 28 is cooperatively configured with handle assembly 26 such that first shell member 30 can pivot relative to handle assembly 26 so as to maintain one of its sides 42 against cooking surface 18, as shown in FIG. 1, so that only a relatively small amount of oil is necessary to fry tortilla 12 into taco shell 14. As shown in FIG. 4, brace assembly 28 has a proximal end 58 and a distal end 60, the positioning being relative to handle assembly 26, and comprises an outer stabilizer brace 62 and an inner stabilizer brace 64. Outer stabilizer brace 62 has a transverse member 66 defining the proximal end 58 of brace assembly 28 and inner stabilizer brace 64 has a transverse member 68 at its distal end, though separate from distal end 60 of brace assembly 28, that is in spaced apart relation to the transverse member 66 of outer stabilizer brace 62. The distal end 60 of brace assembly 28 attaches to first shell member 30, preferably at the first end 36 thereof, as shown in FIG. 4. In the preferred embodiment, brace assembly 28 is fixedly attached to first shell member 30 so as to stiffen and generally stabilize first shell member 30 in the U-shaped configuration shown. In an alternative embodiment, brace assembly 28 is integral with first shell member 30 at the distal ends of outer stabilizer brace 62. As shown in FIG. 4, inner stabilizer brace 64 extends toward first shell member 30 from, preferably, the transverse member 66 of outer stabilizer brace 62. In the preferred embodiment, outer stabilizer brace 62 and inner stabilizer brace 64 are integral. The width of transverse member 68 of inner stabilizer brace 64 is configured to be slightly less than the width of the open first end 46 of second shell member 32, as best shown in FIG. 2, such that when second shell member 32 is in spaced apart relation to first shell member 30 (i.e., as shown in FIG. 3), the first end 46 of second shell member 32 will pass over inner stabilizer brace 64 and between it and outer stabilizer brace 62, as shown in FIG. 3.

Figure 6:
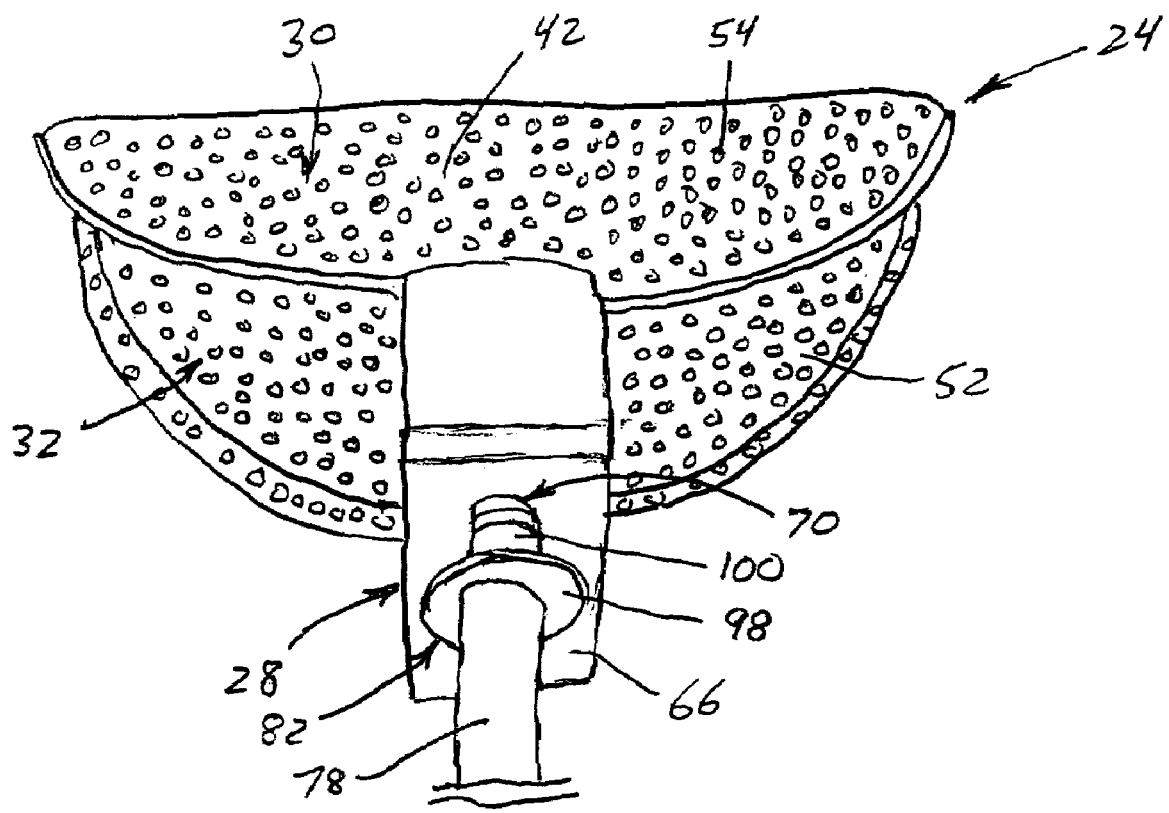
FIG. 6 is a front perspective view shown the brace assembly attached to the shell section of the cooking utensil of the present invention.

Transverse member 66 of outer stabilizer brace 62, which is the proximal end 58 of brace assembly 28, is provided with aperture 70, and likewise, transverse member 68 of inner stabilizer brace 64 is provided with aperture 72, as best shown in FIGS. 3 and 6. As explained in more detail below apertures 70 and 72 are configured to cooperatively engage and/or receive components of handle assembly 26. To provide the pivoting action desired for cooking utensil 10 of the present invention, apertures 70 and 72 are preferably elongated, in the nature of a slot or slit in transverse members 66 and 68. The function of apertures 70 and 72 are set forth in more detail below.

Figure 7:
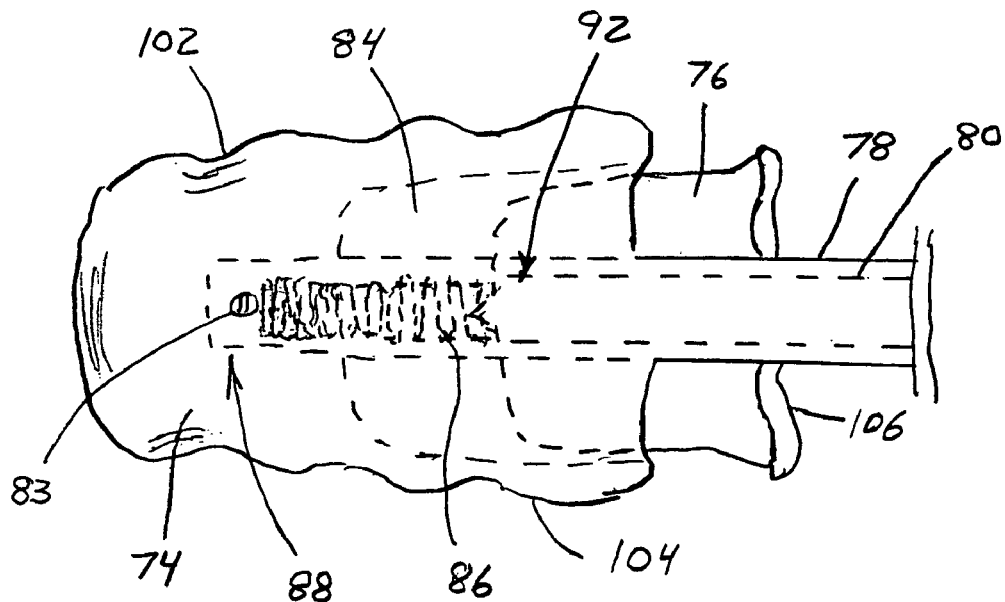
FIG. 7 is a top view of the first and second handle sections of the cooking utensil of the preferred embodiment showing the second handle section in its biased position.
Figure 8:
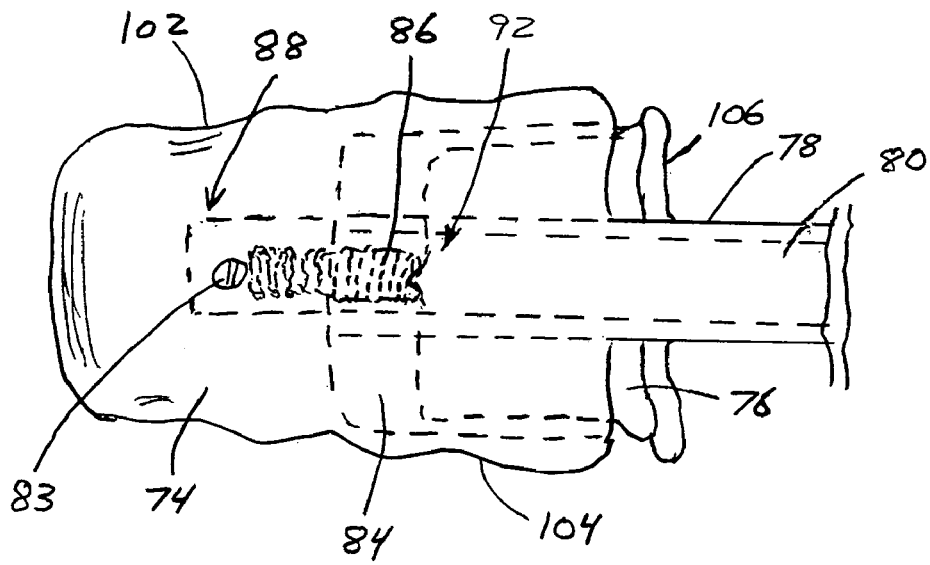
FIG. 8 is a top view of the first and second handle sections of the cooking utensil of the preferred embodiment showing the second handle section pulled into the cavity of the first handle section.

Handle assembly 28 generally comprises a first handle member 74, a second handle member 76, an tubular outer shaft 78, an inner shaft 80, a connecting mechanism 82 configured to slidably connect outer shaft 78 to the proximal end 58 of brace assembly 28 at aperture 70 and a connector 83 (such as a screw or the like), as best shown in FIGS. 7 and 8. As these figures illustrate, first handle member 74 has an interior cavity 84 in which a portion of second handle member 76 is moveably received. A biasing mechanism 86, such as the spring shown, is disposed inside cavity 84 and is configured to bias second handle member 76 out of cavity 84 towards shell section 24. In the preferred embodiment, shown in the figures, the proximal end of second handle member 76 has a V-shaped section that engages the distal end of biasing mechanism 86 so as to hold biasing mechanism 86 in place. Connector 83 retains outer shaft 78 in first handle member 74, by passing at least partially therethrough, and functions as a stop member to prevent rearward movement of biasing mechanism 86. As explained more below, the biasing of second handle member 76 out of cavity 84, which is shown in FIG. 7, will push second shell member 32 towards its nesting or abutting relation with first shell member 30, whereas the application of a force against second handle member 76, such as applied by the user of cooking utensil 10 with his or her fingers, that is sufficient to overcome the biasing force will push second handle member 76 into cavity 84, as shown in FIG. 8, and draw shell member 32 from first shell member 30 so as to place the two shell members 30 and 32 in spaced apart relation, as shown in FIG. 3. To achieve the above operation, the first end 88 of outer tubular shaft 78 is connected to first handle member 74 beyond the proximal end of cavity 84 by connector 83, the second end 90 of outer tubular shaft 78 is connected to the proximal end 58 of brace assembly 28, inner shaft 80 is slidably disposed in outer tubular shaft 78, the first end 92 of inner shaft 80 is connected to the proximal end of second handle member 76 and the second end 94 of inner shaft 80 is connected to second shell member 32, as shown in FIGS. 2, 3 and 6 through 8. Second handle member 76 is sized and configured to slidably fit within the opening defined by cavity 84 inside first handle member 74 and first end 92 of inner shaft 80 is connected to second handle member 76 such that the movement of second handle member 76 into cavity 84 pulls inner shaft with it. In the preferred embodiment, outer shaft 78 is attached at its proximal end to first handle member 74 with a screw or other connector 83 and, at its opposite end, to transverse member 66 of outer stabilizer brace 62 at the proximal end 58 of brace assembly 28 such that outer shaft does not move. In this embodiment, the second end 94 of inner shaft 80 extends beyond the second end 90 of outer shaft 78. As best shown in FIGS. 2 and 3, the second end 94 of inner shaft 80 extends through aperture 72 in inner stabilizer brace 64 to fixedly connect to the bottom 50 of second shell member 32. An inner shell brace 96, best shown in FIG. 3, interconnects the second end 94 of inner shaft 80 with the bottom 50 of second shell member 32 such that the substantially linear movement of inner shaft 80 towards first handle member 74 will draw second shell member 32 away from its nesting relation with first shell member 30. In the preferred embodiment, inner shell brace 96 comprises a swivel screw assembly having a retainer element 97, such as a cotter pin or the like, that allows inner shaft 80 to freely pivot relative to second shell member 32, thereby maintaining the side 42 to side 52 relation of first 30 and second 32 shell members when laying against cooking surface 18.

As set forth above, in the preferred embodiment of cooking utensil 10 of the present invention, handle assembly 26 is configured to pivot relative to shell section 24. More specifically, first 74 and second 76 handle members, outer 78 and inner 80 shafts and the swivel screw assembly at inner shell brace 96 are configured to pivot relative to first shell member 30, second shell member 32 and brace assembly 82. As stated above, in the preferred embodiment connecting mechanism 82 is configured to allow the second end 90 of outer shaft 78 to slidably engage aperture 70 in outer stabilizer brace 62 at the proximal end 58 of brace assembly 28. In a preferred configuration, connecting mechanism 82 comprises an outer washer 98 welded to outer shaft 78 near its second end 90, such that it is positioned on the proximal side of transverse member 66, and an inner retainer washer 100 at the second end 90 of outer shaft 78 that is positioned on the distal side of transverse member 68, such that the two washers 98 and 100 essentially straddle the transverse member 68, as best shown in FIGS. 2 and 3. Preferably, transverse member 66 has a slight curvature thereto and outer 98 and inner 100 washers are flared or otherwise shaped to correspond to the curvature of transverse member 66 to facilitate smooth pivoting movement of outer shaft 78. As connecting mechanism 82 slides along transverse member 66 to pivot handle assembly 26, inner shaft will correspondingly move inside aperture 72 of transverse member 68 and pivot second shell member 32, although only somewhat slightly. The pivoting of outer shaft 78, as well as the rest of handle assembly 26, relative to first shell member 30 allows the cook to keep one side 42 of the U-shaped body 34 of first shell member 30 against cooking surface 18 when in use to make taco shell 14 no matter how high, within reason, the sidewall 20 may be relative to the cooking surface 18 of frying pan 16. In this manner, the cook can use a low level or volume of cooking oil in frying pan 16 and fry one side of tortilla 12 at a time, flipping cooking utensil 10 over to fry the other side. The low level of cooking oil in frying pan 16 is much preferred so as to reduce the splatter of hot oil and, therefore, the likelihood of injury to the cook.

As best shown in FIGS. 2, 7 and 8, the first 74 and second 76 handle members are configured to provide a more ergonomic and comfortable grip for the user utilizing cooking utensil 10 of the present invention. The sides 102 and 104 of first handle member 74 preferably shaped and configured to be held in the hand of a variety of different size people having different sized hands. Preferably, the thumb and the ring and pinky fingers will be able to wrap around first handle member 74 to comfortably hold first handle member 74 in the palm of the user's hand. The distal end 106 of second handle member 76 should be shaped and configured to receive the user's pointer and index fingers so that he or she may easily pull second handle member 76 into cavity 84 inside first handle member 74, as discussed above, to draw second shell member 32 away from its nesting relation with first shell member 30.

As stated above, when cooking utensil 10 or any other cooking utensil rests against the upper edge 22 of sidewall 20 some of the heat from frying pan 16 will transfer to cooking utensil 10. To dissipate some of this heat, cooking utensil 10 of the present invention preferably includes a heat dissipating element 108 on outer shaft 78, as best shown in FIG. 1. Heat dissipating element 108 is configured to rest against upper edge 22 and place outer shaft 78 in spaced apart relation to sidewall 20 so as to reduce the efficiency of the heat transfer to cooking utensil 10. In the preferred configuration, heat dissipating element 108 is a wire member that is configured to have a length that allows the user to utilize its benefits for different sizes of frying pans 16. Heat dissipating element 108 is provided with a plurality of notched sections 110 that receive the upper edge 22 of sidewall 20 and safely hold cooking utensil 10 in place with shell section 24 against cooking surface 18.

Cooking utensil 10 of the present invention can be made out of a wide variety of different materials. Preferably, the materials are selected to be relatively lightweight, heat resistant, resistant to cooking oil and sufficiently rigid to accomplish the objectives of the present invention. As an example, but not intended to limit the present invention, first 74 and second 76 handle members can be made out of plastic for comfort and to avoid issues with regard to heat from frying pan 16 and the remaining components can be made out of stainless steel, aluminum or other metals, preferably those which are intended to be food grade quality and able to withstand the rigors of machine washing. If desired, the outer surface of first shell member 30, which is the part of cooking utensil 10 that contacts cooking surface 18, can be coated with Teflon® or other non-stick material to avoid sticking issues. The sizes of holes 54 and 56 in first 30 and second 32 shell members, respectively, can be selected so as to best reduce any splattering of cooking oil while allowing sufficient heated oil into tortilla 12 to form taco shell 14. Although cooking utensil 10 can be of virtually any size, it is preferred that it be manufactured to correspond with typically available tortillas 12 and frying pans 16. In use, the user grasps first handle member 74 in the palm of his or her hand and uses their index and pointer fingers to pull second handle member 76 into cavity 84, thereby linearly drawing second shell member 32 away from its nesting relation with first shell member 30. A tortilla 12 is folded and inserted into the gap between first shell member 30 and second shell member 32 so as to substantially align itself with first 30 and second 32 shell members. The user then releases the pressure on second handle member 76 to allow the biasing mechanism 86 to push second shell member 32 against the tortilla 12 so as to secure it between the first 30 and second 32 shell members, as shown in FIG. 2. The shell section 24 is then lowered into a frying pan 16 or other cooking container having a sufficient amount of cooking oil to cover and fry at least one side of the tortilla. Once the first side is fried, the user flips cooking utensil 10 over to cook the other side of tortilla 12, thereby forming taco shell 14. With taco shell 14 now cooked, the user removes cooking utensil 10 from the frying pan 16 and then applies pressure to second handle member 76 to push it into cavity 84 and linearly draw second shell member 32 away from taco shell 14, placing second shell member in spaced apart relation thereto and to first shell member 30, so the user may remove taco shell 14 from cooking utensil 10. Unlike some of the prior art devices, cooking utensil 10 of the present invention allows the user to easily remove taco shell 14 without damaging it.

While there are shown and described herein specific forms of the invention, it will be readily apparent to those skilled in the art that the invention is not so limited, but is susceptible to various modifications and rearrangements in design and materials without departing from the spirit and scope of the present invention. In particular, it should be noted that the present invention is subject to modification with regard to any dimensional relationships set forth herein, which are merely presented for exemplary purposes, and modifications in assembly, materials, size, shape, and use. For instance, there are numerous components described herein that can be replaced with equivalent functioning components to accomplish the objectives of the present invention.

What is claimed is:

1. A cooking utensil for frying a tortilla into a taco shell, said cooking utensil comprising:
   a first shell member having a substantially U-shaped body with an open first end and an opposing second end;
   a second shell member having a substantially U-shaped body with an open first end and an opposing second end, said second shell member disposed in said open first end of said first shell member in substantially nesting relation with said first shell member;
   a brace assembly attached to said first shell member;
   a tubular outer shaft having a first end and a second end, said second end of said outer shaft attached to said brace assembly;
   an inner shaft having a first end and a second end, said inner shaft moveably disposed in said outer shaft, said second end of inner shaft extending beyond said second end of said outer shaft and attached said second shell member; and
   a handle assembly having a first handle member attached to said first end of said outer shaft, a second handle member attached to said first end of said inner shaft and means interconnecting said first handle member and said second handle member for biasing said second handle member away from said first handle member,
   wherein said means for biasing biases said second handle member, said inner shaft and said second shell member towards said first shell member so as to secure said tortilla between said first shell member and said second shell member and wherein movement of said second handle member into said cavity of said first handle member draws said second shell member toward said brace assembly so as to place said first shell member and said second shell member in space apart relation for insertion of said tortilla therebetween and removal of said taco shell therefrom.

2. The cooking utensil according to claim 1, wherein at least one of said body of said first shell member and said body of said second shell member comprise a plurality of holes.

3. The cooking utensil according to claim 1, wherein each of said body of said first shell member and said body of said second shell member comprise a plurality of holes.

4. The cooking utensil according to claim 1, wherein said means for biasing is a spring.

5. The cooking utensil according to claim 1, wherein said second end of said outer shaft attaches at an aperture disposed in said brace assembly, said second end of said inner shaft extending beyond said aperture to said second shell member.

6. The cooking utensil according to claim 5, wherein said aperture is elongated and said second end of said outer shaft is slidably connected to said aperture so as to allow said brace assembly and said outer shaft to pivot relative to said first shell member so as to maintain a sidewall of said first shell member on a cooking surface.

7. The cooking utensil according to claim 1, wherein said brace assembly and said outer shaft are cooperatively configured so as to pivot said outer shaft and said handle assembly relative to said first shell member so as to maintain a sidewall of said first shell member on a cooking surface.

8. The cooking utensil according to claim 1, wherein said first handle member comprises a cavity and said second handle member is moveably received in said cavity, said means for biasing disposed in said cavity so as to bias said second handle member substantially out of said cavity.

9. The cooking utensil according to claim 1, wherein said second end of said first shell member and said second end of said second shell member are closed.

10. The cooking utensil according to claim 1 further comprising a handle support member on said outer shaft, said handle support member configured to support said outer shaft above a sidewall of a pan.

11. The cooking utensil according to claim 1, wherein said brace assembly comprises an outer stabilizer brace and an inner stabilizer brace, said outer stabilizer brace interconnecting said outer shaft and said first shell member, said inner stabilizer brace attached to said outer stabilizer brace and extending therefrom toward said open first end of said second shell member.

12. The cooking utensil according to claim 11, wherein said second end of said outer shaft is slidably connected to a first aperture on said outer stabilizer brace, said second end of said inner shaft extending through said first aperture and through a second aperture on said inner stabilizer brace to said second shell member.

13. The cooking utensil according to claim 1, wherein said brace assembly and said first shell member are integral.

14. A cooking utensil for frying a tortilla into a taco shell, said cooking utensil comprising:
   a first shell member having a substantially U-shaped body with an open first end and an opposing second end;
   a second shell member having a substantially U-shaped body with an open first end and an opposing second end, said second shell member disposed in said open first end of said first shell member in substantially nesting relation with said first shell member;
   a brace assembly having a proximal end and a distal end, said distal end of said brace assembly attached to said first shell member, said proximal end of said brace assembly having an aperture disposed therein;
   a tubular outer shaft having a first end and a second end, said second end of said outer shaft slidably attached to said brace assembly at said aperture;
   an inner shaft having a first end and a second end, said inner shaft moveably disposed in said outer shaft, said second end of inner shaft extending beyond said second end of said outer shaft and attached said second shell member; and
   a handle assembly having a first handle member attached to said first end of said outer shaft, a second handle member attached to said first end of said inner shaft and means interconnecting said first handle member and said second handle member for biasing said second handle member away from said first handle member,
   wherein said means for biasing linearly biases said second handle member, said inner shaft and said second shell member towards said first shell member so as to secure said tortilla between said first shell member and said second shell member and wherein movement of said second handle member into said cavity of said first handle member draws said second shell member toward said brace assembly so as to place said first shell member and said second shell member in space apart relation for insertion of said tortilla therebetween and removal of said taco shell therefrom.

15. The cooking utensil according to claim 14, wherein said first handle member comprises a cavity and said second handle member is moveably received in said cavity, said means for biasing disposed in said cavity so as to bias said second handle member substantially out of said cavity.

16. The cooking utensil according to claim 14 further comprising a handle support member on said outer shaft, said handle support member configured to support said outer shaft above a sidewall of a pan.

17. The cooking utensil according to claim 14, wherein said brace assembly comprises an outer stabilizer brace and an inner stabilizer brace, said outer stabilizer brace interconnecting said outer shaft and said first shell member, said inner stabilizer brace attached to said outer stabilizer brace and extending therefrom toward said open first end of said second shell member.

18. The cooking utensil according to claim 17, wherein said second end of said outer shaft is slidably connected to a first aperture on said outer stabilizer brace, said second end of said inner shaft extending through said first aperture and a second aperture on said inner stabilizer brace to said second shell member.

19. A cooking utensil for frying a tortilla into a taco shell, said cooking utensil comprising:
- a first shell member having a substantially U-shaped body with an open first end and an opposing second end, said body having a plurality of holes;
- a second shell member having a substantially U-shaped body with an open first end and an opposing second end, said body of said second shell member having a plurality of holes, said second shell member disposed in said open first end of said first shell member in substantially nesting relation with said first shell member;
- a brace assembly having a proximal end and a distal end, said distal end of said brace assembly attached to said first shell member, said proximal end of said brace assembly having an elongated aperture disposed therein;
- a tubular outer shaft having a first end and a second end, said second end of said outer shaft slidably attached to said brace assembly at said elongated aperture so as to allow said brace assembly and said outer shaft to pivot relative to said first shell member;
- an inner shaft having a first end and a second end, said inner shaft moveably disposed in said outer shaft, said second end of inner shaft extending beyond said second end of said outer shaft and attached said second shell member; and
- a handle assembly having a first handle member attached to said first end of said outer shaft, a second handle member attached to said first end of said inner shaft and means disposed in a cavity of said first handle member and interconnecting said first handle member and said second handle member for biasing said second handle member away from said first handle member, said second handle member moveably received in said cavity,
- wherein said means for biasing linearly biases said second handle member, said inner shaft and said second shell member towards said first shell member so as to secure said tortilla between said first shell member and said second shell member and wherein movement of said second handle member into said cavity of said first handle member draws said second shell member toward said brace assembly so as to place said first shell member and said second shell member in space apart relation for insertion of said tortilla therebetween and removal of said taco shell therefrom.

20. The cooking utensil according to claim 19, wherein said brace assembly comprises an outer stabilizer brace and an inner stabilizer brace, said outer stabilizer brace interconnecting said outer shaft and said first shell member, said inner stabilizer brace attached to said outer stabilizer brace and extending therefrom toward said open first end of said second shell member, said second end of said inner shaft extending through said elongated aperture and a second aperture on said inner stabilizer brace to said second shell member.

* * * * *